(12) United States Patent
Ishikawa

(10) Patent No.: US 8,661,940 B2
(45) Date of Patent: Mar. 4, 2014

(54) WAVE GEAR DEVICE HAVING THREE-DIMENSIONAL CONTINUOUS CONTACT TOOTH PROFILE

(75) Inventor: Shoichi Ishikawa, Yokohama (JP)

(73) Assignee: Harmonic Drive Systems Inc., Shinagawa-Ku, Tokyo (JP)

( * ) Notice: Subject to any disclaimer, the term of this patent is extended or adjusted under 35 U.S.C. 154(b) by 262 days.

(21) Appl. No.: 13/376,218

(22) PCT Filed: May 9, 2011

(86) PCT No.: PCT/JP2011/002565
§ 371 (c)(1),
(2), (4) Date: Dec. 5, 2011

(87) PCT Pub. No.: WO2012/153363
PCT Pub. Date: Nov. 15, 2012

(65) Prior Publication Data
US 2012/0285283 A1    Nov. 15, 2012

(51) Int. Cl.
*F16H 33/00* (2006.01)
(52) U.S. Cl.
USPC .............................. 74/640; 74/661
(58) Field of Classification Search
USPC ................... 74/640, 468, 665 L, 661
See application file for complete search history.

(56) References Cited

U.S. PATENT DOCUMENTS

| | | | |
|---|---|---|---|
| 2,906,143 A | | 9/1959 | Musser |
| 4,825,720 A | * | 5/1989 | Capdepuy ........................ 74/640 |
| 4,974,470 A | * | 12/1990 | Ishikawa et al. ................ 74/640 |
| 5,282,398 A | * | 2/1994 | Ishikawa .......................... 74/640 |
| 5,456,139 A | * | 10/1995 | Aubin ............................. 74/640 |
| 5,458,023 A | * | 10/1995 | Ishikawa et al. ................ 74/640 |
| 5,687,620 A | * | 11/1997 | Ishikawa ......................... 74/640 |
| 5,782,143 A | * | 7/1998 | Ishikawa ......................... 74/640 |

(Continued)

FOREIGN PATENT DOCUMENTS

| | | |
|---|---|---|
| JP | 45-41171 | 12/1970 |
| JP | 63-115943 A | 5/1988 |
| JP | 64-79448 A | 3/1989 |
| WO | WO 2010/070712 A1 | 6/2010 |

*Primary Examiner* — David M Fenstermacher
(74) *Attorney, Agent, or Firm* — Buchanan Ingersoll & Rooney PC

(57) ABSTRACT

In a wave gear device, similarity curve tooth profiles for defining the tooth-face tooth profile of each of a flexible externally toothed gear and a rigid internally toothed gear is determined from the movement trajectory, relative to a tooth of the rigid internally toothed gear, of a tooth of the flexible externally toothed gear at a main cross-section at which the deflection factor is $\kappa=1$. Tooth profile curves, which have been subjected to profile shifting corresponding to the difference between the deflection factor $\kappa_o$ ($>1$) of the opening-end cross-section of the flexible externally toothed gear and the deflection factor $\kappa$ of the main cross-section, are determined from the similarity curves; and the tooth profile curves are used to form the tooth-face tooth profile portions of the two gears. High-gear-tooth compound tooth profiles, defined from the tooth-face tooth profile portions, straight-line tooth profile portions continuing from the tooth-face tooth profile portions, and appropriate tooth-flank tooth profile portions for avoiding interference are used as tooth profiles of the internal teeth and the external teeth. Also, taking coning of the flexible externally toothed gear into account, negative profile shifting is applied from an opening-end cross-section to an inner-end cross-section of the flexible externally toothed gear, and rational meshing between the two gears is obtained along the entire tooth trace.

2 Claims, 11 Drawing Sheets

(56) References Cited

U.S. PATENT DOCUMENTS

| | | | |
|---|---|---|---|
| 5,918,508 A * | 7/1999 | Ishikawa | 74/640 |
| 5,931,054 A * | 8/1999 | Shirokoshi et al. | 74/640 |
| 6,167,783 B1 * | 1/2001 | Ishikawa | 74/640 |
| 6,467,375 B1 * | 10/2002 | Ishikawa | 74/640 |
| 6,526,849 B1 * | 3/2003 | Ishikawa | 74/640 |
| 6,799,489 B2 * | 10/2004 | Ishikawa | 74/640 |
| 6,912,930 B2 * | 7/2005 | Wang et al. | 74/640 |
| 7,117,759 B2 * | 10/2006 | Ishikawa | 74/461 |
| 7,328,632 B2 * | 2/2008 | Ishikawa | 74/640 |
| 7,694,607 B2 * | 4/2010 | Ishikawa et al. | 74/640 |
| 7,735,396 B2 * | 6/2010 | Ishikawa et al. | 74/640 |
| 7,891,272 B2 * | 2/2011 | Schonlau | 74/640 |
| 8,028,603 B2 * | 10/2011 | Ishikawa | 74/640 |
| 8,215,205 B2 * | 7/2012 | Zhang | 74/640 |
| 8,302,507 B2 * | 11/2012 | Kanai | 74/640 |
| 8,555,505 B2 * | 10/2013 | Ishikawa | 29/893.3 |
| 2011/0237382 A1 | 9/2011 | Ishikawa | |

* cited by examiner (a)　　　(b)　　　(c)

WAVE GEAR DEVICE HAVING THREE-DIMENSIONAL CONTINUOUS CONTACT TOOTH PROFILE

TECHNICAL FIELD

The present invention relates to an improvement of a tooth profile of a rigid internally toothed gear and a flexible externally toothed gear in a wave gear device. More specifically, the present invention relates to a wave gear device having a three-dimensional continuous contact tooth profile in which a predetermined meshing state is maintained at each axially perpendicular cross-section at each position along the direction of the tooth trace.

BACKGROUND ART

Since his invention (Patent Document 1) by C. W. Musser, the founder, wave gear devices have been the subject of a variety of inventions and designs until the present day, both by him and other researchers including the inventor of the present invention. Even with regards specifically to tooth profile, the inventions are diverse. For example, the inventor of the present invention has proposed using an involute tooth profile as the basic tooth profile in Patent document 2; and proposed a method for designing a tooth profile, where a technique is used in which meshing of a rigid internally toothed gear and a flexible externally toothed gear is approximated as a rack in order to obtain an addendum tooth profile for the two gears that contact each other over a wide range, in Patent Documents 3 and 4.

Typically, a wave gear device has an annular rigid internally toothed gear; a flexible externally toothed gear arranged coaxially on an inside of the rigid internally toothed gear; and a wave generator fitted on an inside of the flexible externally toothed gear. The flexible externally toothed gear comprises a flexible cylindrical barrel part; a diaphragm extending in a radial direction from a rear end of the cylindrical barrel part; and an external tooth formed on an outer circumferential surface portion on a side towards a front-end opening of the cylindrical barrel part. The flexible externally toothed gear is deflected into an ellipsoidal shape by the wave generator, and caused to mesh with the rigid internally toothed gear at both end parts in the direction of the major axis of the ellipse.

The amount of deflection of the external teeth of the flexible externally toothed gear deflected into an ellipsoidal shape increases from a side towards the diaphragm to the front-end opening along the tooth trace direction of the external teeth, the amount of deflection being substantially proportional with respect to the distance from the diaphragm. Each portion of the teeth part of the flexible externally toothed gear is repeatedly deflected in the radial direction as the wave generator rotates. However, up to the present, insufficient consideration has been given with regards to a method for setting a rational tooth profile, in which the deflecting movement (coning) of the flexible externally toothed gear caused by the wave generator has been taken into account.

In Patent Document 5, the inventor of the present invention has proposed a wave gear device provided with a tooth profile in which the coning of the tooth has been taken into account. In the wave gear device proposed in Patent document 5, an arbitrary position of a cross section perpendicular to the axis of the flexible externally toothed gear, which is taken on an arbitrary position along the tooth trace direction, is designated as a main cross-section. A configuration is in place so that the degree of deflection $2\kappa mn$ (where $\kappa$ is a deflection factor, m is the module, and n is a positive integer) of the flexible externally toothed gear from a neutral circle of the rim before deflection is set so that the rim is deflected to a zero-deviation state of $2\kappa mn$ ($k=1$) at a major-axis position on a neutral line of the elliptical rim of the gear in the main cross-section.

The meshing between the flexible externally toothed gear and the rigid internally toothed gear is approximated as rack meshing. A movement trajectory of a tooth of the flexible externally toothed gear relative to a tooth of the rigid internally toothed gear that accompanies rotation of the wave generator is determined for an axially perpendicular cross-section at each position, including the main cross-section, along the flexible externally toothed gear in the tooth trace direction. There is determined a first similarity curve BC, in which a curve portion extending from a top point A to a next bottom point B of a zero-deviation movement trajectory obtained on the main cross-section is scaled down $\lambda$-fold (where $\lambda<1$) using the point B as the center of similarity transformation. The first similarity curve BC is used as a basic tooth profile of the addendum of the rigid internally toothed gear.

Then, there is determined a second similarity curve in which a curve obtained by rotating the first similarity curve BC by 180 degrees about an end point C of the first similarity curve BC is scaled up $(1-\lambda)/\lambda$-fold using the point C as the center of similarity transformation. The second similarity curve is used as a basic tooth profile of the addendum of the flexible externally toothed gear.

In addition, the tooth profile of the flexible externally toothed gear has been subjected to profile shifting, applied to tooth profile portions on both sides of the main cross-section in the direction of the tooth trace of the flexible externally toothed gear, so that both of each negative-deviation-side movement trajectory and each positive-deviation-side movement trajectory describe a curve that comes into contact at a bottom part of the zero-deviation movement trajectory; the negative-deviation-side movement trajectory being obtained in each axially perpendicular cross-section that is deflected to a negative deviation state (deflection factor $\kappa<1$) in which deflection occurs further towards the diaphragm than the main cross-section; and the positive-deviation-side movement trajectory being obtained in each axially perpendicular cross-section that is deflected to a positive deviation state (deflection factor $\kappa>1$) in which deflection occurs further towards the front-end opening than the main cross-section.

In a wave gear device in which the tooth profile has been formed as described above, it is possible to obtain effective meshing over the entire range of the tooth trace extending from the main cross-section to the side towards the diaphragm and the range of the tooth trace extending from the main cross-section to the opening part, centered around continuous meshing of the tooth profile extending over a wide range on the main cross-section. It is thereby possible to transmit a larger torque compared to a conventional wave gear device in which meshing occurs over a narrower tooth trace range.

PRIOR ART DOCUMENTS

Patent Documents

Patent Document 1: U.S. Pat. No. 2,906,143
Patent Document 2: JP-B 45-41171
Patent Document 3: JP-A 63-115943
Patent Document 4: JP-A 64-79448

DISCLOSURE OF THE INVENTION

Problems to be Solved by the Invention

Currently, there is strong demand from the market for improving the load torque performance of wave gear devices and preventing ratcheting. In order to achieve this, a rational high-gear-tooth tooth profile, in which coning of the teeth is taken into account and in which continuous meshing is made possible, is necessary.

With the foregoing circumstances in view, an object of the present invention is to propose a wave gear device, in which necessary profile shifting is applied to a tooth trace of a flexible externally toothed gear;

a tooth profile, along each axially perpendicular cross-section, of the flexible externally toothed gear whose amount of deflection changes from positive deviation to negative deviation along the direction of the tooth trace is defined by applying necessary profile shifting to a tooth profile of similarity curves derived from a movement trajectory of a tooth, so that a state of three-dimensional contact between two gears can be formed and the transmitted torque can be increased, and so that the two gears can be set so as to have high gear teeth and the ratcheting torque can be increased.

Means Used to Solve the Above-Mentioned Problems

In order to achieve the above-mentioned object, the tooth profile is formed as follows according to a wave gear device of the present invention.

(1) A similarity curve tooth profile for each of the gears, for defining the tooth-face tooth profile of each of the teeth of each of the two gears, is obtained from the movement trajectory of an external tooth of the flexible externally toothed gear relative to the internal tooth of the rigid internally toothed gear at a main cross-section at which the deflection factor is $\kappa=1$ and at which no deviation is present.

(2) The similarity curve tooth profile of each of the internal tooth and the external tooth is subjected to profile shifting corresponding to the difference between the deflection factor $\kappa_o$ (>1) at the opening-end cross-section on the side towards the opening end in the direction of the tooth trace of the external teeth of the flexible externally toothed gear and the deflection factor $\kappa$ (=1) at the main cross-section of the external teeth of the flexible externally toothed gear. Each of the resulting tooth profiles is used as a basic tooth-face tooth profile of each of the internal teeth and the external teeth.

(3) A high-gear-tooth compound tooth profile, defined from the tooth-face tooth profile defined as described above, a straight-line tooth profile continuing from the tooth-face tooth profile, and an appropriate tooth-flank tooth profile for avoiding interference is used as a tooth profile of the opening-end cross-section of the external teeth of the flexible externally toothed gear.

(4) A high-gear-tooth compound tooth profile, defined from the basic tooth-face tooth profile defined as described above, a straight-line tooth profile continuing from the tooth-face tooth profile, and an appropriate tooth-flank tooth profile for avoiding interference is used as a tooth profile of the internal teeth of the rigid internally toothed gear.

(5) A profile-shifted tooth profile, in which the compound tooth profile used as the tooth profile of the opening-end cross-section has been subjected to profile shifting, is used as the tooth profile for each position, along the direction of the tooth trace between the opening-end cross-section and the inner-end cross-section, of the external tooth of the flexible externally toothed gear. The profile shifting is performed in order to take coning of the flexible externally toothed gear into account, and is performed so that a relative movement trajectory of an external tooth of the flexible externally toothed gear, in relation to an internal tooth of the rigid internally toothed gear, that is obtained at each cross-section in the direction of the tooth trace shares a bottom part thereof with a movement trajectory of the opening-end cross-section of the external tooth.

Effect of the Invention

According to the present invention, it is possible to obtain effective meshing between the external teeth of the flexible externally toothed gear and the internal teeth of the rigid internally toothed gear along the entire tooth trace of the external teeth. Therefore, an even greater torque can be transmitted. Also, since the tooth profile of the two gears corresponds to high gear teeth, a high ratcheting torque can be obtained.

BRIEF DESCRIPTION OF THE DRAWINGS

FIG. 2(a) shows a state before deformation, FIG. 2(b) shows a cross-section including a major axis of a flexible externally toothed gear which has deformed into an ellipsoidal shape, and FIG. 2(c) shows a cross-section including a minor axis of flexible externally toothed gear which has deformed into an ellipsoidal shape;

BEST MODE FOR CARRYING OUT THE INVENTION

A wave gear device to which the present invention has been applied will now be described with reference to the accompanying drawings.

Figure 1:
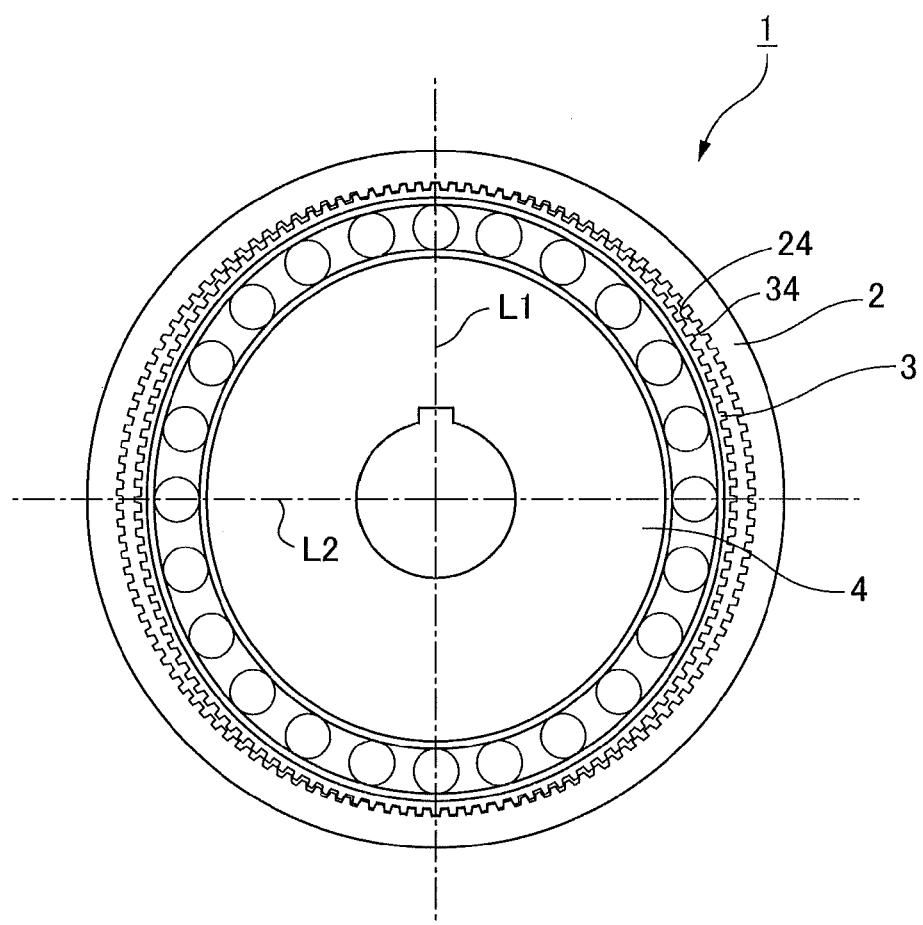
FIG. 1 is a schematic front view of a general wave gear device.

FIG. 1 is a front view of a wave gear device according to the present invention; and FIGS. 2(a) through (c) are cross-section views through an axis showing a state in which an opening part of a flexible externally toothed gear of the wave gear device is deflected into an ellipsoidal shape; wherein FIG. 2(a) shows a state before deformation; FIG. 2(b) shows a cross-section including a major axis of an ellipsoidal curve after deformation; and FIG. 2(c) shows a cross-section including a minor axis of the ellipsoidal curve after deformation. In FIGS. 2(a) through (c), solid lines represent a cup-shaped flexible externally toothed gear, and broken lines represent a silk-hat-shaped flexible externally toothed gear.

As shown in the drawings, a wave gear device 1 comprises an annular rigid internally toothed gear 2; a flexible externally toothed gear 3 arranged on an inside thereof; and a wave generator 4 having an ellipsoidal profile, fitted on an inside thereof. Each of the rigid internally toothed gear 2 and the flexible externally toothed gear 3 is a spur gear having a module m. Also, the difference in the number of teeth between the two gears is 2n (where n is a positive integer), and the rigid internally toothed gear 2 has a greater number of teeth. The flexible externally toothed gear 3 is deflected into an ellipsoidal shape by the wave generator 4, which has an ellipsoidal profile; and is caused to mesh with respect to the rigid internally toothed gear 2 at both end portions of the direction of a major axis L1 of the ellipsoidal shape. When the wave generator 4 rotates, the positions at which meshing occurs between the two gears 2, 3 move in the circumferential direction, and a relative rotation, which corresponds with the difference in the number of teeth between the two gears, is generated between the two gears 2, 3. The flexible externally toothed gear 3 comprises a flexible cylindrical barrel part 31; a diaphragm 32 extending in the radial direction in continuation with a rear end 31b of the cylindrical barrel part 31; a boss 33, which is provided in continuation from the diaphragm 32; and external teeth 34 formed on an outer circumferential surface portion of a side towards an opening end 31a of the cylindrical barrel part 31.

The ellipsoidally profiled wave generator 4, fitted into an inner circumferential portion of a portion of the cylindrical barrel part 31 at which the external teeth are formed, causes the amount of deflection of the cylindrical barrel part 31 towards the outside or the inside in the radial direction to gradually increase from the rear end 31b on the side towards the diaphragm to the opening end 31a. As shown in FIG. 2(b), along a cross-section that includes the major axis L1 of the ellipsoidal curve, the amount of deflection towards the outside gradually increases in proportion to the distance from the rear end 31b to the opening end 31a; and as shown in FIG. 2(c), along a cross-section that includes the minor axis L2 of the ellipsoidal curve, the amount of deflection towards the inside gradually increases in proportion to the distance from the rear end 31b to the opening end 31a. Therefore, the amount of deflection of the external teeth 34, which are formed on the outer circumferential surface portion on the side towards opening end 31a, varies between each axially perpendicular cross-section in the direction of tooth trace. Specifically, with regards to each of the external teeth 34, the amount of deflection gradually increases, from an inner-end cross-section 34b on the side towards the diaphragm in the direction of the tooth trace to an opening-end cross-section 34a on the side towards the opening end 31a in the direction of the tooth trace, in proportion to the distance from the rear end 31b.

Figure 3:
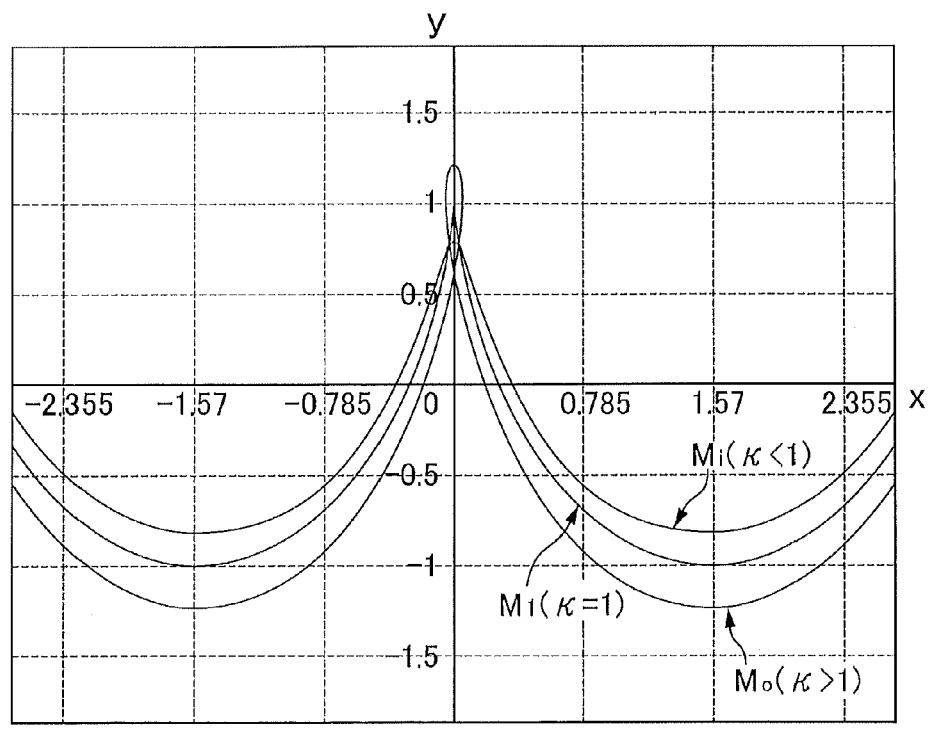
FIG. 3 is an illustrative diagram showing movement trajectories obtained in an instance in which the relative movement of the two gears at an axially perpendicular cross-section of the tooth profile at an arbitrary position along the direction of the tooth trace is approximated using a rack.

FIG. 3 is a diagram showing movement trajectories of an external tooth 34 of the flexible externally toothed gear 3 in relation to an internal tooth 24 of the rigid internally toothed gear 2 that is obtained in an instance in which the relative movement of the teeth of the two gears 2, 3 of the wave gear device 1 is approximated using a rack. In the diagram, the x-axis represents a direction of the parallel movement of the rack, and the y-axis represents a direction that is perpendicular to the x-axis. In an axially perpendicular cross-section at an arbitrary position in the direction of the tooth trace of the external teeth 34 of the flexible externally toothed gear 3, the amount of deflection at the major axis position L1 on an ellipsoidal rim neutral line of the external teeth 34, relative to a rim neutral circle before the external teeth 34 are deflected into an ellipsoidal shape, is $2\kappa mn$, where $\kappa$ is the deflection factor. The movement trajectory of the external tooth 34 of the flexible externally toothed gear 3 is given by the following equation.

$$x = 0.5mn(\theta - \kappa \sin \theta) \quad (1)$$

$$y = \kappa mn \cos \theta$$

If m=1 and n=1 (i.e., the difference in the number of teeth is 2) in order to keep the description simple, the movement trajectory is given by the following equation.

$$x = 0.5(\theta - \kappa \sin \theta) \quad (1A)$$

$$y = \kappa \cos \theta$$

The origin of the y-axis in FIG. 3 is the average position of the amplitude of the movement trajectory. Of the movement trajectories, a zero-deviation movement trajectory $M_1$ is one that is obtained in an instance of a zero-deviation, standard deflection state where the deflection factor $\kappa=1$; a positive-deviation movement trajectory $M_o$ is one that is obtained in an instance of a positive-deviation deflection state where the deflection factor $\kappa>1$; and a negative-deviation movement trajectory $M_i$ is one that is obtained in an instance of a negative-deviation deflection state where the deflection factor $\kappa<1$. In the present invention, the amount of deflection is set so that a zero-deviation movement trajectory, where the deflection factor $\kappa=1$, is obtained at a main cross-section (i.e., an axially perpendicular selected cross-section at a predetermined position in the direction of the tooth trace of the external teeth 34 of the flexible externally toothed gear), which represents the basis of forming the tooth profile of each of the two gears 2, 3. Specifically, when the deflection factor at the opening-end cross-section 34a on the side towards the opening in the direction of the tooth trace of the external teeth 34 is represented by $\kappa_o$, and the deflection factor at the inner-end cross-section 34b on the side towards the diaphragm is represented by the deflection factor of the main cross-section is $\kappa=1$, where $\kappa_o>1$ and $\kappa_i<1$.

Figure 2:
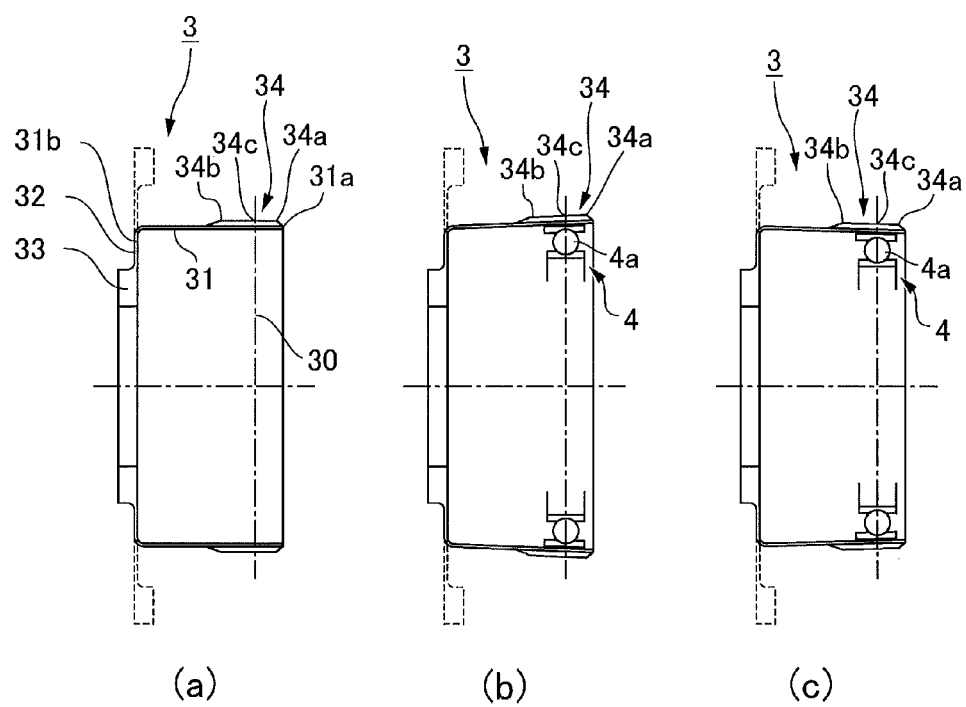
FIG. 2 is a illustrative diagram showing a state of deflection of a flexible externally toothed gear, where

For example, as shown in FIG. 2, the main cross-section 34c is set to a position shown by a straight line that passes through a ball 4a of a bearing of the wave generator 4. In this instance, the deflection factor of the movement trajectory on each cross-section between the main cross-section 34c and the opening-end cross-section 34a is represented by $\kappa>1$, and the deflection factor of the movement trajectory on each cross-section between the main cross-section 34c and the inner-end cross-section 34b on the side towards the diaphragm is represented by κ<1.

(Tooth Profile Shape of the Two Gears)

Before a description is given for a method for forming the tooth profile shape, a description will be given for an example of a tooth profile of the two gears 2, 3 according to the present invention with reference to FIG. 6. First, the tooth profile shape of the opening-end cross-section 34a of an external tooth 34 is defined by a convex-curve-shaped external-tooth tooth-face tooth profile portion 41; an external-tooth straight-line tooth profile portion 42 continuing from the external-tooth tooth-face tooth profile 41; a concave-curve-shaped external-tooth tooth-flank tooth profile portion 43 continuing from the external-tooth straight-line tooth profile 42; and an external-tooth root portion 44 continuing from the external-tooth tooth-flank tooth profile portion 43. The tooth profile shape of a portion of each of the external teeth 34 extending from the opening-end cross-section 34a to the inner-end cross-section 34b is a profile-shifted tooth profile shape, in which the tooth profile shape shown in the drawing has been subjected to negative profile shifting as described further below.

The tooth profile shape of the internal tooth 24 is uniform in the direction of the tooth trace thereof, and is defined by a convex-curve-shaped internal-tooth tooth-face tooth profile portion 51; an internal-tooth straight-line tooth profile portion 52 continuing from the internal-tooth tooth-face tooth profile portion 51; a concave-curve-shaped internal-tooth tooth-flank tooth profile portion 53 continuing from the straight-line tooth profile portion 52; and an internal-tooth root portion 54 continuing from the internal-tooth tooth-flank tooth profile portion 53.

[Method for Forming Tooth Profile of the Two Gears]

(Tooth Profile Shape at Opening-End Cross-Section of External Tooth)

In the present invention, the tooth profile of each of the internal teeth 24 and the external teeth 34 are formed by the following procedure.

(1) Similarity Curve Tooth Profile

A similarity curve tooth profile for each of the gears, for defining the tooth-face tooth profile of each of the teeth of each of the two gears, is obtained from the movement trajectory of an external tooth of the flexible externally toothed gear relative to the internal tooth of the rigid internally toothed gear at the main cross-section at which the deflection factor is κ=1 and at which no deviation is present.

(2) Basic Tooth-Face Tooth Profile

The similarity curve tooth profile of each of the internal tooth and the external tooth is subjected to profile shifting corresponding to the difference between the deflection factor $κ_o$ (>1) at the opening-end cross-section on the side towards the opening end in the direction of the tooth trace of the external teeth of the flexible externally toothed gear and the deflection factor κ (=1) at the main cross-section of the external teeth of the flexible externally toothed gear. Each of the tooth profiles thereby obtained is used as a basic tooth-face tooth profile of each of the internal teeth and the external teeth.

(3) Tooth Profile Shape of Opening-End Cross-Section of External Teeth

A high-gear-tooth compound tooth profile, defined from the tooth-face tooth profile defined as described above, a straight-line tooth profile continuing from the tooth-face tooth profile, and an appropriate tooth-flank tooth profile for avoiding interference is used as a tooth profile of the opening-end cross-section of the external teeth of the flexible externally toothed gear.

(4) Tooth Profile Shape of Internal Teeth

A high-gear-tooth compound tooth profile, defined from the basic tooth-face tooth profile defined as described above, a straight-line tooth profile continuing from the tooth-face tooth profile, and an appropriate tooth-flank tooth profile for avoiding interference is used as a tooth profile of the internal teeth of the rigid internally toothed gear.

(5) Tooth Profile Shape at Positions of External Tooth Other than the Opening-End Cross-Section A profile-shifted tooth profile, in which the compound tooth profile used as the tooth profile of the opening-end cross-section has been subjected to profile shifting, is used as the tooth profile for each position, along the direction of the tooth trace between the opening-end cross-section and the inner-end cross-section, of the external tooth of the flexible externally toothed gear. The profile shifting is performed in order to take coning of the flexible externally toothed gear into account, and is performed so that a relative movement trajectory of an external tooth of the flexible externally toothed gear, in relation to an internal tooth of the rigid internally toothed gear, that is obtained at each cross-section in the direction of the tooth trace shares a bottom part thereof with a movement trajectory of the opening-end cross-section of the external tooth.

The procedures (1) through (5) will now be described in a specific manner with reference to FIGS. 4 and 5.

(Similarity Curve Tooth Profile and Basic Tooth-Face Tooth Profile)

Figure 4:
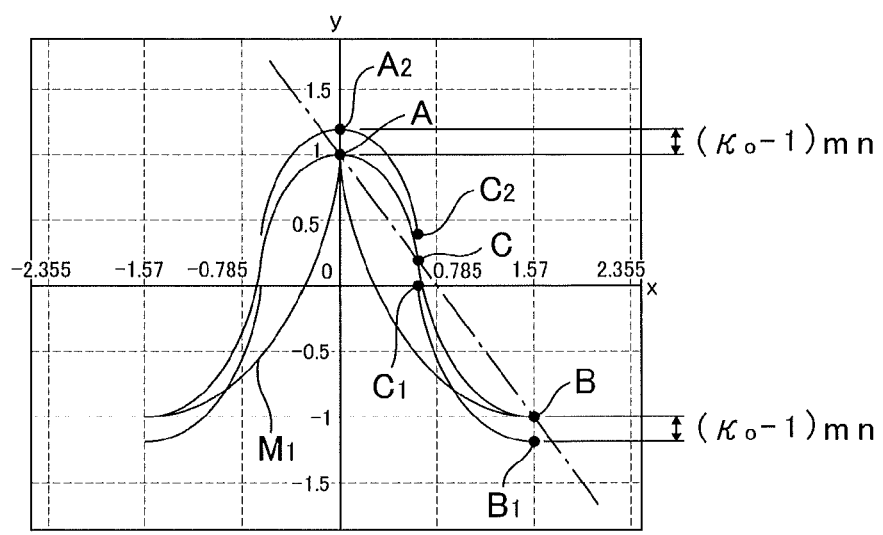
FIG. 4 is an illustrative diagram showing a basic tooth profile of the respective tooth face of the two gears, derived from the movement trajectory at the main cross-section (i.e., zero-deviation cross-section) of the tooth profile.
Figure 5:
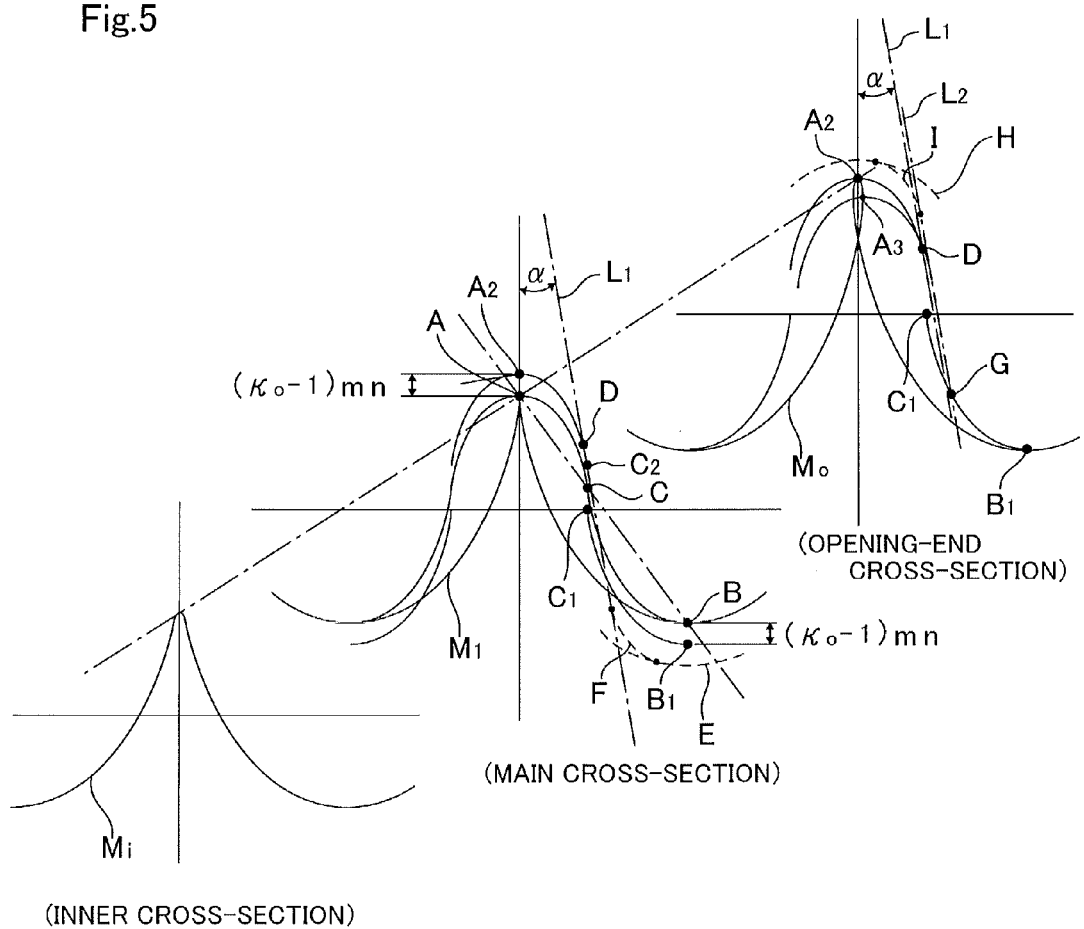
FIG. 5 is an illustrative diagram showing a procedure for setting the tooth profile of the two gears.

In FIGS. 4 and 5, label $M_1$ represents the movement trajectory of the external tooth 34 at the main cross-section 34c (i.e., zero-deviation cross-section; κ=1).

In the movement trajectory $M_1$, a parameter θ takes on a range between π (point B: bottom part of movement trajectory) and 0 (point A: top part of movement trajectory). This curve AB is subjected to a λ-fold (similarity ratio λ<1) similarity transformation using point B as the center of similarity, whereby a first similarity curve BC is obtained.

A curve $B_1C_1$, obtained by moving the first similarity curve BC in the direction of the tooth face of the rigid internally toothed gear 2 (i.e., the minus-direction along the y-axis in FIG. 4) by $(κ_o−1)$mn is used as a provisional tooth-face tooth profile (basic tooth-face tooth profile) of the rigid internally toothed gear.

Next, the first similarity curve BC is rotated by 180 degrees, using an end point C (θ=0) of the first similarity curve BC as the center of similarity transformation. A curve thereby obtained is subjected to a $(1−λ)/λ$-fold similarity transformation using the end point C as the center of similarity, whereby a second similarity curve CA is obtained. FIG. 4 shows an instance in which λ=0.6. A curve $C_2A_2$, obtained by moving the second similarity curve CA towards the direction of the tooth face of the flexible externally toothed gear (i.e., the plus-direction along the y-axis in FIG. 4) by $(κ_o−1)$mn is used as a provisional tooth-face tooth profile (basic tooth-face tooth profile) of the flexible externally toothed gear.

The curves $B_1C_1$ and $C_2A_2$ can be expressed as equations as follows.

Basic formula for a curve used to form the basic tooth-face tooth profile of the rigid internally toothed gear:

$$x_{Ca}=0.5\{(1−λ)π+λ(θ−\sin θ)\}$$

$$y_{Ca}=λ(1+\cos θ)−κ_o (0≤θ≤π) \quad (2)$$

Basic formula for a curve used to form the basic tooth-face tooth profile of the flexible externally toothed gear:

$$x_{Fa}=0.5\{(1−λ)(π−θ+\sin θ)\}$$

$$y_{Fa}=(λ−1)(1+\cos θ)+κ_o (0≤θ≤π) \quad (3)$$

(Tooth Profile Shape of Opening-End Cross-Section of External Teeth)

Next, the basic tooth-face tooth profile (curve $C_2A_2$) is used to form an external-tooth tooth profile at the opening-end cross-section 34a of the external tooth 34 as follows. First, a straight line L1, which intersects the curve $C_2A_2$ defining the tooth-face tooth profile of the flexible externally toothed gear at a pressure angle α, is drawn. A curve portion $A_2D$ of the curve $C_2A_2$ between an end point $A_2$ to an intersection point D with respect to the straight line $L_1$ is determined. The external-tooth tooth-face tooth profile portion 41 is defined by the curved portion $A_2D$. The external-tooth straight-line tooth profile portion 42 is defined by the straight line $L_1$ extending from the intersection point D. The external-tooth tooth-flank tooth profile portion 43 is defined by a concave curve F, which links the external-tooth straight-line tooth profile portion 42 and the external-tooth root portion 44 defined by a predetermined external-tooth root curve E, so that a predetermined top clearance is obtained for the external-tooth straight-line tooth profile portion 42 in relation to the internal tooth 24.

(Tooth Profile Shape of Internal Teeth)

Next, in relation to the opening-end cross-section 34a of the external tooth 34, there is determined a position at which the external-tooth tooth profile formed as described above cuts in towards the internal tooth by the greatest amount after passing the peak $A_2$ of a movement trajectory $M_o$ in an instance in which the external-tooth tooth profile has moved along the movement trajectory $M_o$, as shown in FIG. 5. Specifically, there is determined a position at which the external-tooth tooth profile has moved to point $A_3$, in the loop at the peak of the movement trajectory $M_o$, at which the pressure angle is 0 degrees. The internal-tooth straight-line tooth profile portion 52 is defined by a straight line $L_2$ representing this position. Also, an intersection point G between the internal-tooth straight-line tooth profile portion 52 and the curve $B_1C_1$ is determined, and the internal-tooth tooth-face tooth profile portion 51 is defined using a curve portion $B_1G$ of the curve $B_1C_1$ extending from an end point $B_1$ and the intersection point G. Then, the internal-tooth tooth-flank tooth profile portion 53 is defined by a concave curve I, which links the internal-tooth straight-line tooth profile portion 52 and the internal-tooth root portion 54 defined by a predetermined root curve H, so that a predetermined top clearance is obtained for the internal-tooth straight-line tooth profile portion 52 in relation to an external tooth.

The tooth profile at the tooth flank of each of the two gears does not participate in meshing. Therefore, the respective tooth-flank tooth profile of each of the two gears can be set freely as long as no interference takes place with respect to the tooth-face tooth profile 51, 52, 41, 42 of the opposing gear.

Figure 6:
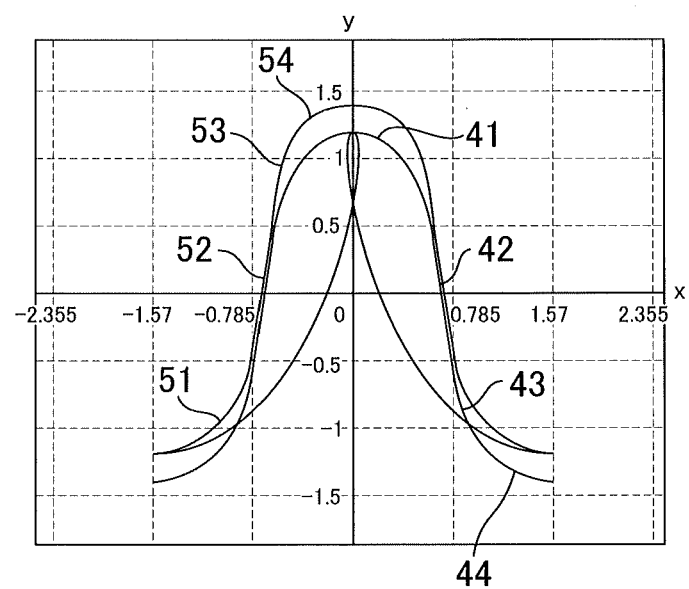
FIG. 6 is an illustrative diagram showing an example of a tooth profile of the two gears at an axially perpendicular cross-section at a front-end part of the external teeth, which is on the side towards the opening of the flexible externally toothed gear (i.e., a positive-deviation cross-section)

As described further above, FIG. 6 shows an example of a tooth profile of each of the two gears 2, 3 at the position of the opening-end cross-section. In this example, the pressure angle α of the straight-line tooth profile is 9 degrees. Portions of the tooth-face tooth profile where the pressure angle is near 0 degrees are less desirable in terms of machining the gear, it being possible for the straight-line tooth profile to be formed from a point at which the pressure angle is between 6 and 10 degrees, and linked to the tooth-flank tooth profile (Tooth Profile Shape at Positions of External Tooth Other than the Opening-End Cross-Section)

The tooth profile shape of a portion of the external tooth 34 extending from the opening-end cross-section 34a to the inner-end cross-section 34b is a profile-shifted tooth profile set as follows. Specifically, the profile-shifted tooth profile shape is one in which the external-tooth tooth profile of the opening-end cross-section 34a has been subjected to negative profile shifting so that the movement trajectory of the external tooth 34 relative to the internal tooth 24 obtained by rack approximation for each axially perpendicular cross-section from the opening-end cross-section 34a to the inner-end cross-section 34b is tangent, at the bottom part $B_1$ thereof, to the movement trajectory $M_o$ obtained at the opening-end cross-section 34a.

To give a detailed description, for the flexible externally toothed gear 3, the linearity of a cylindrical generatrix thereof is sufficiently maintained in a state in which the neutral cylindrical surface of the cylindrical barrel part 31 of the flexible externally toothed gear 3 has been deformed into an ellipsoidal shape due to insertion of the wave generator 4. Therefore, the amount of deflection of the flexible externally toothed gear 3 is one that is substantially proportional, along the major axis from the side towards the diaphragm to the opening part, to the distance from the diaphragm. Therefore, with regards to the tooth profile of each of the external tooth 34 and the internal tooth 24 set as described above, although normal meshing is maintained at the position of the opening-end cross-section 34a in the direction of the tooth trace, at other portions, movement trajectories of positions other than the opening-end cross-section 34a (e.g., the movement trajectory $M_1$ of the main cross-section and the movement trajectory $M_1$ of the inner-end cross-section) interfere with the movement trajectory $M_o$ of the opening-end cross-section 34a as shown in FIG. 3, and normal meshing therefore cannot be maintained.

Therefore, the external tooth 34 is subjected to profile shifting as described below, so that normal meshing can be guaranteed, even in an approximate manner and even partially, on all cross-sections along the direction of the tooth trace of the external tooth 34. Specifically, the profile shifting amount mnh is set so that the movement trajectory at each of the cross-sections is tangent to the bottom part $B_1$ of the movement trajectory $M_o$ at the opening-end cross-section 34a, in relation to each of the cross-sections of the external tooth 34 from the position of the opening-end cross-section 34a to the position of the inner-end cross-section 34b on the side towards the diaphragm. In an instance in which m=1 and n=1, the amount of profile shifting is equal to h, and takes on a negative value represented by the following equation.

$$h = \kappa - \kappa_o \qquad (4)$$

Figure 7:
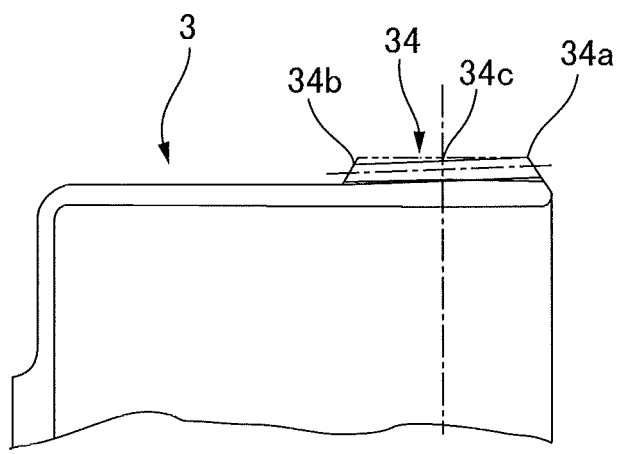
FIG. 7 is an illustrative diagram showing the shape, in the direction of the tooth trace, of a tooth of the flexible externally toothed gear after being subjected to profile shifting.

FIG. 7 shows the shape of the external tooth in this instance.

Figure 8:
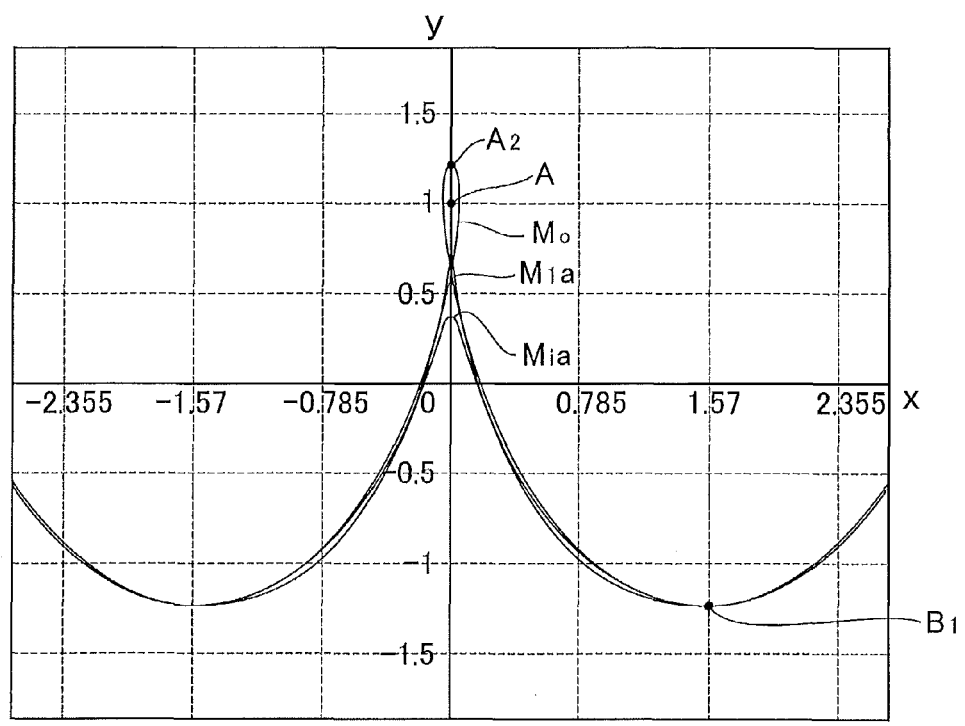
FIG. 8 is an illustrative diagram showing three movement trajectories, at the main cross-section and cross-sections in front of and behind the main cross-section of the tooth profile after being subjected to profile shifting.

Next, FIG. 8 shows three movement trajectories $M_o$, $M_{1a}$, $M_{ia}$ of the opening-end cross-section 34a, the main cross-section 34c, and the inner-end cross-section 34b of the external tooth 34 after profile shifting has been applied as described above. The movement trajectories $M_{1a}$, $M_{ia}$ are tangent to the movement trajectory $M_o$ at the bottom part B1, and the trajectories are a good approximation with the exception of a portion at the peak. This indicates the possibility that a tooth profile derived from the movement trajectory according to the present invention is capable of meshing across the entire tooth trace with the exception of a portion at the peak.

Figure 9A:
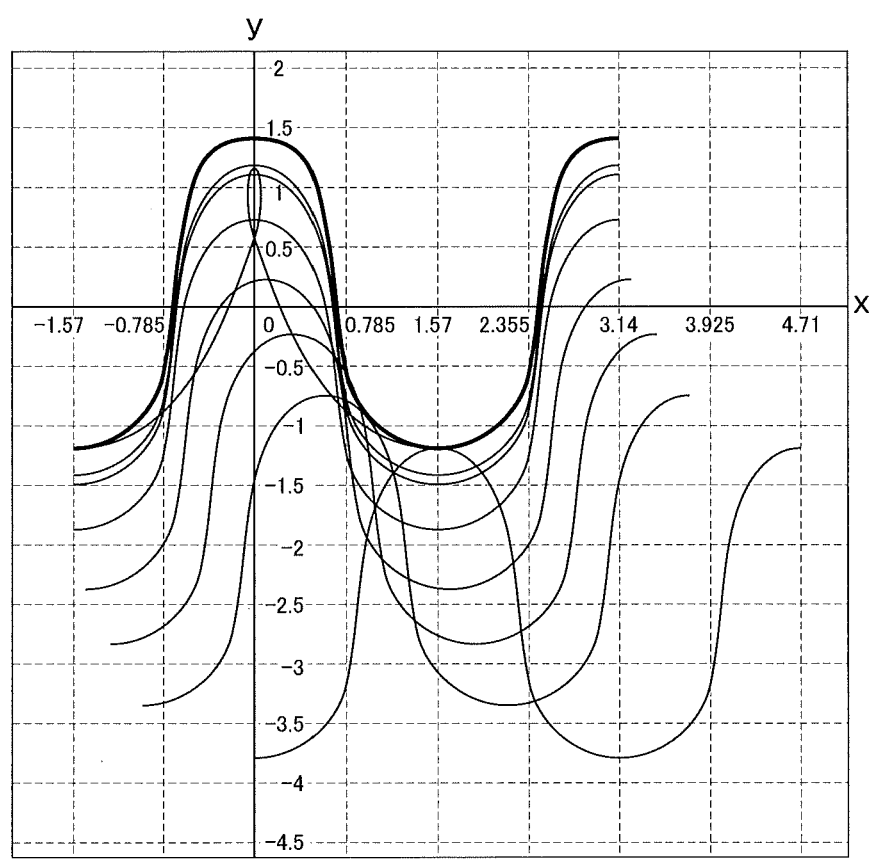
FIG. 9A is an illustrative diagram showing the circumstances of meshing at an axially perpendicular cross-section of the tooth profile of the two gears at a front-end part of the external teeth, which is on the side towards the opening.
Figure 9B:
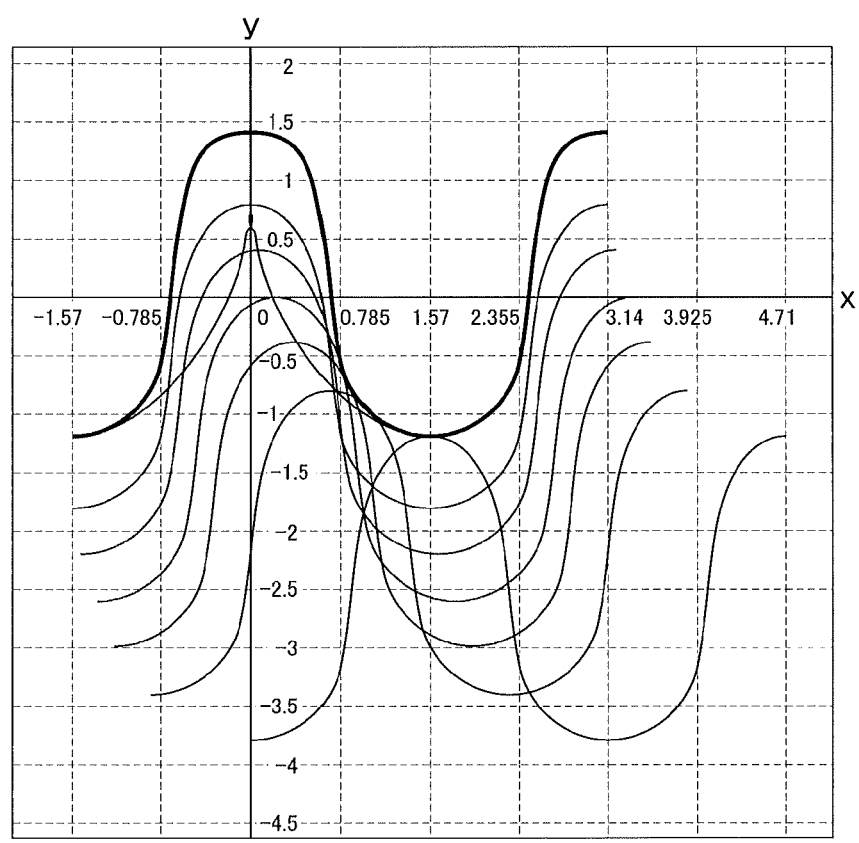
FIG. 9B is an illustrative diagram showing the circumstances of meshing at a main cross-section (i.e., zero-deviation cross-section) of the tooth profile of the two gears.
Figure 9C:
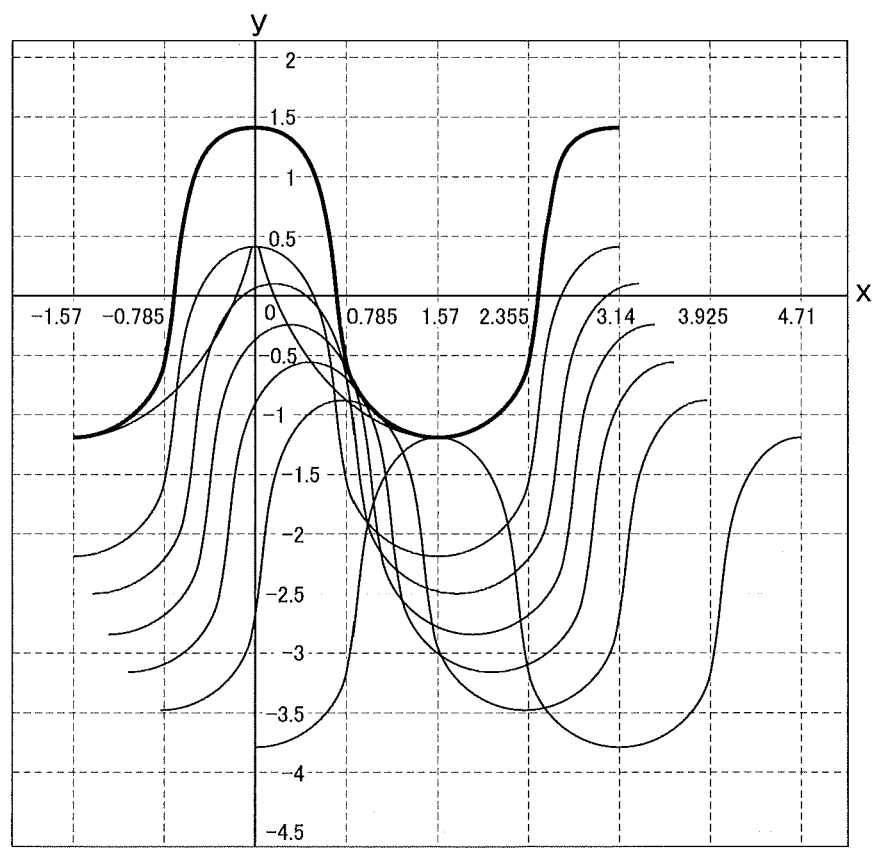
FIG. 9C is an illustrative diagram showing the circumstances of meshing at an axially perpendicular cross-section of the tooth profile of the two gears at a rear-end part of the external teeth, which is on the side towards the diaphragm.

FIGS. 9A, 9B and 9C show the circumstances of meshing of the tooth profiles at each axially perpendicular cross-section of the tooth profiles according to the present example as rack approximation. FIG. 9A is an illustrative diagram showing the circumstances of meshing at the opening-end cross-section 34a; FIG. 9B is an illustrative diagram showing the circumstances of meshing at the main cross-section 34c; and FIG. 9C is an illustrative diagram showing the circumstances of meshing at the inner-end cross-section 34b. The movement trajectory of the tooth profile at each of the cross-sections match closely at the portion of the movement trajectory around the bottom part thereof, indicating the possibility of meshing across the entire tooth trace of the tooth profiles according to the present example.

The invention claimed is:
1. A wave gear device, comprising
an annular rigid internally toothed gear;
a flexible externally toothed gear, arranged coaxially on an inside of the rigid internally toothed gear; and
a wave generator, fitted on an inside of the flexible externally toothed gear; wherein
the flexible externally toothed gear is provided with a flexible cylindrical barrel part, a diaphragm extending in a radial direction from a rear end of the cylindrical barrel part, and external teeth formed on an outer circumferential surface portion on a side towards a front-end opening of the cylindrical barrel part,
the external teeth of the flexible externally toothed gear deflected into an ellipse-like shape by the wave generator are meshed with inner teeth of the rigid internally toothed gear at both end parts in a direction of a major axis of an ellipse-like curve;
an amount of deflection of the external teeth of the flexible externally toothed gear deflected into the ellipse-like shape increases from a side towards the diaphragm to a side towards the front-end opening along a direction of a tooth trace of the external teeth, the amount of deflection being substantially proportional with respect to a distance from the diaphragm;
each of the external teeth of the flexible externally toothed gear and each of the internal teeth of the rigid internally toothed gear are configured as on a spur gear having a module m;
a number of teeth of the flexible externally toothed gear is set to a number that is 2n less than a number of teeth of the rigid internally toothed gear, where n is a positive integer;
in an axially perpendicular cross-section of the external teeth at an arbitrary position in a tooth trace direction, the amount of deflection in a radial direction at a major axis position on an ellipse-like rim neutral line of the external teeth, relative to a rim neutral circle before the externally toothed gear are deflected into the ellipse-like shape, is $2\kappa mn$, where $\kappa$ is a deflection factor;
if, in relation to the tooth trace direction of the external teeth of the flexible externally toothed gear, an axially perpendicular cross-section of an end nearer the front-end opening is an opening-end cross-section; an axially perpendicular cross-section of an end nearer the diaphragm is an inner-end cross-section; and an axially perpendicular cross-section designated at an arbitrary position between the opening-end cross-section and the inner-end cross-section is a main cross-section,
the deflection factor of the main cross-section is $\kappa=1$, the deflection factor of the opening-end cross-section is $\kappa=\kappa_o>1$, and the deflection factor of the inner-end cross-section is $\kappa=\kappa_i<1$;
an opening-end tooth profile shape on the opening-end cross-section of each of the external teeth is defined by a convex-curve-shaped external-tooth tooth-face tooth profile portion, an external-tooth straight-line tooth profile portion continuing from the external-tooth tooth-face tooth profile portion, a concave-curve-shaped external-tooth tooth-flank tooth profile portion continuing from the external-tooth straight-line tooth profile portion, and an external-tooth root portion continuing from the external-tooth tooth-flank tooth profile portion;
the tooth profile shape of a portion extending from the opening-end cross-section to the inner-end cross-section is a profile-shifted tooth profile shape, in which the opening-end tooth profile shape has been subjected to a negative profile shift;
a tooth profile shape on an axially perpendicular cross-section of each of the internal teeth is defined by a convex-curve-shaped internal-tooth tooth-face tooth profile portion; an internal-tooth straight-line tooth profile portion continuing from the internal-tooth tooth-face tooth profile portion, a concave-curve-shaped internal-tooth tooth-flank tooth profile portion continuing from the internal-tooth straight-line tooth profile portion, and an internal-tooth root portion continuing from the internal-tooth tooth-flank tooth profile portion;
meshing between the external teeth and the internal teeth is approximated as rack meshing, and a movement trajectory of each of the external teeth of the flexible externally toothed gear relative to the internal teeth of the rigid internally toothed gear that accompanies rotation of the wave generator is determined for individual axially perpendicular cross-sections in the tooth trace direction of each of the external teeth;
a curve portion AB extending from a point A at a peak of the movement trajectory $M_1$ obtained at the main cross-section to a point B at a next bottom part is subjected to a $\lambda$-fold similarity transformation using a similarity ratio of $\lambda<1$ and using point B as a center of similarity transformation, to thereby a first similarity curve BC is determined, and the first similarity curve BC is moved in the direction of the tooth face of the rigid internally toothed gear by $(\kappa_o-1)mn$, to thereby a curve $B_1C_1$ is determined;
a curve obtained by rotating the first similarity curve BC by 180 degrees about an end point C of the first similarity curve BC is subjected to an $(1-\lambda)/\lambda$-fold similarity transformation, using the end point C as a center of similarity transformation, to thereby a second similarity curve CA is determined, and the second similarity curve CA is moved in the direction of the tooth face of the flexible externally toothed gear by $(\kappa_o-1)mn$, to thereby a curve $C_2A_2$ is determined;
a straight line $L_1$ that intersects the $C_2A_2$ at a pressure angle $\alpha$ is drawn, and a curve portion $A_2D$ of the curve $C_2A_2$ between an end point $A_2$ and an intersection point D with respect to the straight line $L_1$ is determined;
the external-tooth tooth-face tooth profile portion is defined by the curve portion $A_2D$;
the external-tooth straight-line tooth profile portion is defined by the straight line $L_1$ extending from the intersection point D;
the external-tooth tooth-flank tooth profile portion is defined by a concave curve, which links the external-tooth straight-line tooth profile portion and the external-tooth root portion defined by a predetermined external-tooth root curve, so that a predetermined top clearance is obtained for the external-tooth straight-line tooth profile portion in relation to the internal teeth;
a position at which the external teeth having the external-tooth straight-line tooth profile portion cut in towards the internal teeth by the greatest amount after passing a peak of the movement trajectory $M_o$ obtained at the opening-end cross-section in an instance in which the external tooth has moved along the movement trajectory $M_o$ is determined, and the external-tooth straight-line tooth profile portion at the corresponding position is used to define the internal-tooth straight-line tooth profile portion;

an intersection point G between the internal-tooth straight-line tooth profile portion and the curve $B_1C_1$ is determined, and a curve portion $B_1G$ of the curve $B_1C_1$ extending from an end point B1 to the intersection point G is used to define the internal-tooth tooth-face tooth profile portion;

the internal-tooth tooth-flank tooth profile portion is defined by a concave curve, which links the internal-tooth straight-line tooth profile portion and the internal-tooth root portion defined by a predetermined root curve, so that a predetermined top clearance is obtained for the internal-tooth straight-line tooth profile portion in relation to an external tooth; and the tooth profile shape of a portion of each of the external teeth extending from the opening-end cross-section to the inner-end cross-section is a profile-shifted tooth profile shape in which the opening-end tooth profile shape has been subjected to negative profile shifting so that the movement trajectory obtained for individual axially perpendicular cross-sections from the inner-end cross-section to the opening-end cross-section is tangent, at a corresponding bottom part B thereof, to the movement trajectory $M_o$ obtained at the opening-end cross-section.

2. The wave gear device according to claim 1, wherein
the amount of profile shifting applied to the external teeth is hmn, wherein $$h = \kappa - \kappa_o.$$

* * * * *